Nov. 19, 1968    B. W. MOLLER    3,411,843
COMPOSITE REARVIEW MIRROR
Filed Feb. 17, 1966
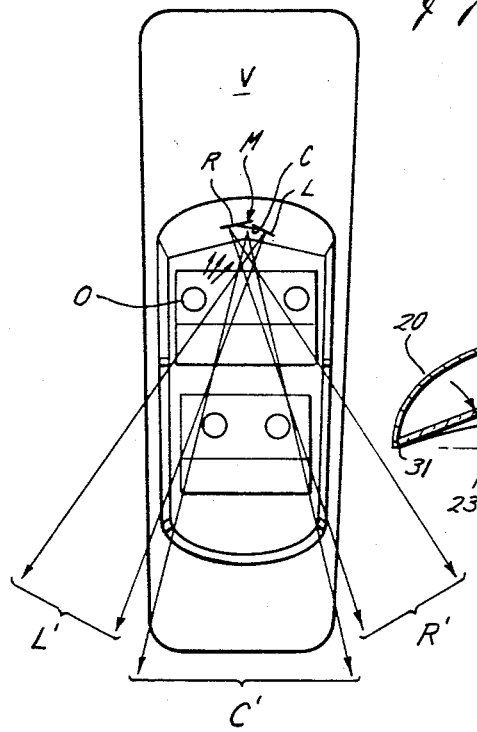
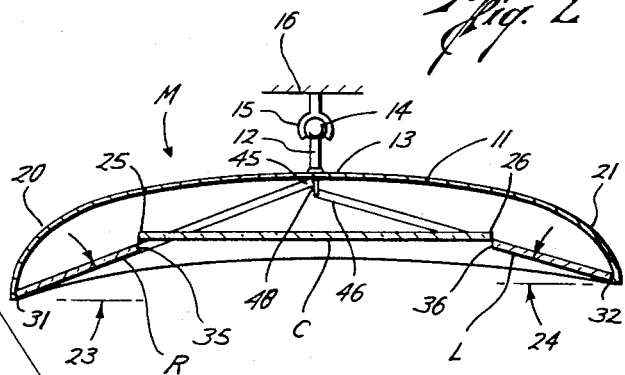
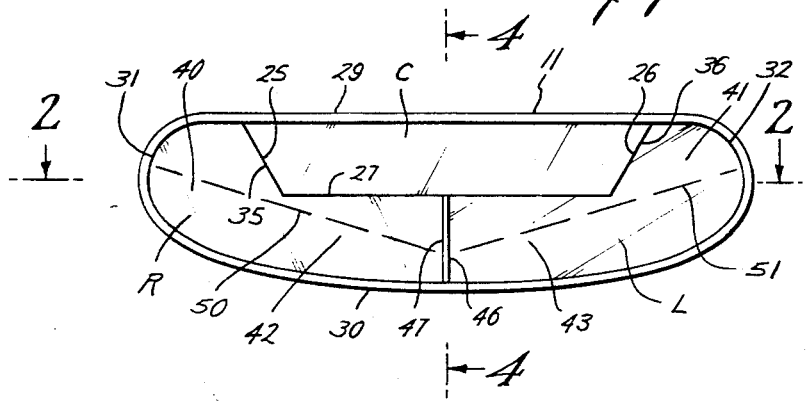
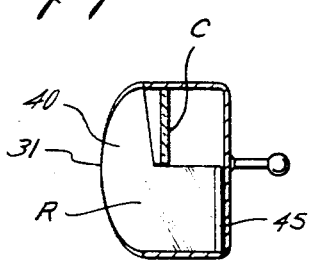
Bynum W. Moller
INVENTOR.
BY Hayden & Pravel
ATTORNEYS

United States Patent Office 3,411,843
Patented Nov. 19, 1968

3,411,843
COMPOSITE REARVIEW MIRROR
Bynum W. Moller, P.O. Box 3631,
Victoria, Tex. 77901
Filed Feb. 17, 1966, Ser. No. 528,269
10 Claims. (Cl. 350—303)

The present invention relates to a new and improved composite rearview mirror and particularly to a composite rearview mirror construction to facilitate a vehicle operator's view of the side and rear sectors of a vehicle.

An object of the present invention is to provide a new and improved rearview mirror with which a vehicle operator can easily view the sectors adjacent to either side of the rear of the vehicle as well as the sector directly to the rear of the vehicle.

Still another object of the present invention is to provide a new and improved segmented composite rearview mirror including a segment for viewing the sector directly behind the vehicle as well as a pair of side angle mirror segments for viewing sectors adjacent the rear corners of the vehicle, wherein such side sector mirror segments have enlarged viewing areas for viewing the rearmost portions of their respective sectors.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a plan view of a vehicle schematically illustrating the mirror of the present invention;

FIG. 2 is a sectional view taken along the line 2—2 of FIG. 3 showing details of construction of the composite mirror of this invention;

FIG. 3 is an elevational view of one form of the composite mirror of this invention; and FIG. 4 is a transverse sectional view taken along the line 4—4 of FIG. 3 illustrating additional details of construction of the mirror of this invention.

Briefly, the composite mirror M of the present invention comprises three substantially flat or plane surface mirror segments including a central mirror segment C for viewing the section C' directly behind the vehicle V as shown in FIG. 1 of the drawings as well as a pair of side sector viewing segments L and R, respectively, for viewing the sectors L' and R' adjacent the rear corners of the vehicle V. With the mirror M of this invention, an operator O of the vehicle V may quickly and easily view all of the sectors L', R' and C' substantially simultaneously merely by glancing at the segments L, R and C of the composite mirror M.

Considering now the apparatus of the present invention in more detail, the mirror M shown in FIG. 2 of the drawings includes a support frame or housing 11 which is normally provided with a pivotal mounting means for pivotally mounting mirror M on the dashboard or some other suitable portion of the frame of the vehicle V. In the preferred form of this invention, such pivotal mounting means includes a ball 14 carried in a suitable socket 15 which may be welded or otherwise suitably secured to the frame 16 of the vehicle V. The ball 14 is connected to one end of a rod or stem 12 with the other end of the rod 12 being secured to the frame 11 at or near its central portion 13. The outer ends 20 and 21, respectively, of such housing 11 are preferably curved or bowed away from such central portion 13 to accommodate the mirror segments C, L and R, respectively.

As shown in FIG. 2 of the drawings, the central sector viewing mirror C is disposed generally longitudinally relative to the housing or frame 11 with the side sector viewing mirror segments R and L, respectively, mounted in the frame 11 at an angle relative to the center mirror segment C. As indicated by the arrows 23 and 24, respectively, the mirror R, which is nearest the driver's side of the vehicle is disposed at a greater angle relative to the center mirror segment C than is the mirror L which is disposed on the opposite side of the mirror segment C from the driver or vehicle operator O. Thus, whether the vehicle operator O is situated to the right or left of the mirror M, such mirror is mounted so that the side sector mirror R is on the same side of the vehicle V as the operator or is nearer the operator O than is the side sector mirror L.

Also, in the preferred form of this invention, as shown of the drawings, the composite mirror M has a horizontal center axis that extends generally horizontally across the face of the composite mirror M approximately midway between the outer longitudinal edges 29 and 30 of the mirror frame or housing 11 and which also coincides with the innermost or lower edge 27 of the center mirror C. Thus it will be seen that the central viewing segment is normally disposed entirely on one side of the horizontal center line 27. It will be noted that the ends 25 and 26 of the center sector mirror C normally extend behind the planes of each of the mirrors R and L, respectively. Also, as best seen in FIG. 3 of the drawings, the ends 25 and 26, respectively, are inclined inwardly toward the vertical center portion of the mirror M.

Each of the angularly disposed side sector viewing mirrors R and L, respectively, has an L shape configuration with the short leg of the L forming the side and the long leg of the L extending longitudinally below the central mirror C. The mirror R has a recess portion defined by edges 25 and 27 and mirror L has a similar recess portion defined by edges 26 and 27 into which the central mirror C extends. As shown, the central mirror C is disposed within the confines of the two L's formed by the side mirrors R and L, respectively. Such mirrors R and L each have enlarged viewing portions 40 and 41 disposed between the outer ends 25 and 26 of the central mirror C and the outer ends 31 and 32, respectively, of the mirror housing 11. Such enlarged portions 40 and 41 also extend vertically from the outer edge 29 to the opposite outer edge 30 of the mirror housing 11. Also, each of the side sector viewing mirrors R and L, respectively, have tapered edges 35 and 36, respectively, which correspond generally with the tapered or inclined edges 25 and 26 of the central mirror C. Such edges 35 and 36 extend from the outer edge 29 to the inner edge 27 of the central mirror C and are tapered inwardly toward the vertical center line 27 at substantially the same angle as the corresponding edges 25 and 26 of the central mirror segment C.

Also, as shown, each of the side angle mirrors R and L includes longitudinally extending portions 42 and 43, respectively, which extend inwardly from the enlarged portions 40 and 41, respectively, toward the center of the mirror M. Such longitudinally extending portions 42 and 43 extend laterally from the inner edge 27 of the central mirror C to the outer edge 30 of the housing 11 and have inner edges 45 and 46 which are substantially parallel to each other and which form a step 48 at their juncture due to the difference in the angular disposition of such side sector viewing segments L and R. Consequently, the enlarged portions 40 and 41 enable the operator O to view the side sectors L' and R', respectively, substantially as far as he can view the central sector C' and to also enable him to continue viewing the movement of a vehicle as it overtakes the vehicle V on either side.

Thus, it will be seen that each of the side angle mirror segments L and R have diagonal axes or centers of vision 50 and 51, respectively, which extend diagonally across the viewing surface of such mirrors R and L from approximately the middle of the inner edges 45 and 46 outwardly to approximately the mid-point of the curved ends 31 and 32. As shown, such centers of vision are tilted upwardly at their outer ends and downwardly at their inner ends which converge at approximately the vertical center of the mirror M and behind the plane of the central mirror C.

Due to the relative positions of the mirror M and the driver O, the angles shown by 50 and 51 reflect most efficiently the area normally visible through the automobile window openings extending from rear window to side door glasses in one continuous reflection. That is, such construction provides a view in the mirrors R and L between the lines of window top and bottom while avoiding a view of the inside of the car. Such elimination of bulk or size in a multiple mirror of this kind is important and this wrap-around effect of the mirrors R and L with respect to the mirror C serves this multiple purpose.

In the preferred form of this invention, the side sector viewing mirrors L and R are colored or tinted blue, green, or some other color or shade so that they may be distinguished from the central viewing portion C which is clear. This will enable the operator O to instantly differentiate and identify the various areas or sectors of the multiple mirror being viewed.

FIG. 4, which is a transverse sectional view, shows the relationship of the central viewing segment C to the inclined viewing segment R in the preferred embodiment of the composite mirror M of this invention. Thus, in FIGS. 2 and 4 of the drawings, it may be seen that the outer curved end 31 of the inclined viewing segment R and the enlarged viewing portion 40 extends in front of the viewing surface of the central viewing segment C while the inner end 45 of such inclined mirror R extends behind the central viewing segment C. Normally, the plane of the central mirror C intersects the plane of the inclined mirror R substantially halfway between its inner end 45 and its outer end 31. Similarly, the centrally disposed mirror C intersects the inclined mirror L substantially halfway between its inner and outer ends 46 and 32, respectively.

Thus, with the arrangement described hereinabove, each of the viewing segments R and L, respectively, has viewing portions numbered 40 and 41, respectively, adajcent the outer edges 25 and 26 of the central viewing segment C which extend transversely the full width of the central mirror segment C and thus emphasize and provide a better view of the critical lateral sectors L' and R', respectively, and make it easier for the driver or operator O to observe oncoming cars or other vehicles that may be overtaking or following the vehicle V in each of these crittical areas L' and R'. Thus, when compared to my prior invention disclosed in United States Patent No. 3,151,-207, it has been found quite unexpectedly that with the apparatus M of this invention, the operator O may see substantially as far in the side sectors L' and R' as he can in the central sector C' and thereby observe substantially simultaneously the lateral viewing sectors L' and R', respectively, and the central sector C' to determine at a glance whether there are other vehicles in these zones. The greater distances shown by the enlarged viewing areas in the mirror M of this invention makes it possible for the operator O to view further in the zones L' and R' flanking his rear and thereby provide more time in which to move or maneuver to the right or left to avoid difficulty.

Also, it will be appreciated that while the mirrors R, L, and C are all shown in the drawings disposed in substantially vertical planes, the mirrors R and L may be tilted or rotated about the longitudinal axis of the mirror M to facilitate viewing, as desired.

In operation, the virtual image of vehicles overtaking the vehicle V directly from the rear in the central sector C' appears in the mirror C and may be viewed in the usual manner. Similarly, the virtual image of vehicles or objects operating or located in lateral zones L' or R' first appear in the large viewing portions 40 or 41, respectively, of the mirrors L or R and then move laterally toward the inner edges 45 or 46, respectively, as the case may be, as such vehicles overtake the vehicle V.

Thus, with the composite mirror M of this invention, the operator O may quickly and easily determine at a glance the objects and activity occupying the lateral zones L' and R' as well as the rear zone C' substantially simultaneously and also differentiate which zone or sector such activity is occurring in.

The foregoing disclosure and description of the invention is illustrative and explanatory thereof, and various changes in the size, shape, and materials as well as in the details of the illustrated construction may be made within the scope of the appended claims without departing from the spirit of the invention.

What is claimed is:

1. A composite rearview mirror for viewing to the rear of a vehicle comprising:
    (a) a housing adapted to be mounted on said vehicle,
    (b) a central mirror segment carried on said housing for viewing the sector directly to the rear of the vehicle,
    (c) a right side sector viewing segment carried in said housing at an angle relative to said central segment for viewing the outside sector of the vehicle at the right rear corner thereof,
    (d) said right side sector viewing segment being set at an angle to the central portion and having a recess portion into which a central mirror segment extends,
    (e) a left side sector viewing segment carried in said housing at an angle relative to said central segment for viewing the outside sector of the vehicle at the left rear corner thereof, and
    (f) said left side sector viewing segment being set at an angle to the central portion and having a recess portion into which a central mirror segment extends.

2. The apparatus of claim 1 wherein the angle between the central portion and the side sector viewing segment on the driver's side of the vehicle is greater than the angle between said central mirror and the side sector viewing portion on the opposite side of the vehicle from the driver's side.

3. The apparatus of claim 1 wherein the angle between the central mirror and the right sector viewing segment is greater than the angle between said central mirror and the left sector viewing segment.

4. The apparatus of claim 1 wherein said central mirror is disposed above the longitudinal portions of said right and left side sector viewing segments.

5. The apparatus of claim 1 including an enlarged portion of the right side sector viewing segment adjacent one end of the central mirror segment and an enlarged portion of the left side sector viewing segment adjacent the other end of the central mirror segment, both of such enlarged portions being disposed in front of the plane of the viewing surface of said central mirror segment.

6. The apparatus of claim 1 wherein the innermost ends of said side sector viewing segments converge behind the plane of the viewing surface of said central segment.

7. The invention of claim 1 wherein said central mirror segment has an inner edge and an outer edge and wherein each of said side sector viewing segments has an inner end and an outer end with a longitudinal viewing axis extending therebetween and wherein said viewing axes are inclined relative to the central mirror segment so as to converge below the inner edge of said central mirror segment.

8. The invention of claim 1 wherein said right side sector viewing segment and said left side sector viewing segment each is colored so as to distinguish it from said central sector viewing segment.

9. The invention of claim 1 wherein said central mirror segment has an inner edge substantially parallel to the longitudinal axis of the composite rearview mirror and the right side sector viewing segment has a viewing axis extending from its outer and toward its inner end and inclined with respect to the longitudinal axis and the left side sector viewing segment has a viewing axis extending from its outer end toward its inner end and inclined at an opposite angle with respect to the viewing axis of said right side sector viewing segment.

10. The invention of claim 1 wherein said right side sector viewing segment and said left side sector viewing segment each is shaded so as to distinguish it from said central sector viewing segment.

References Cited

UNITED STATES PATENTS 3,151,207  9/1964  Moller.

DAVID SCHONBERG, *Primary Examiner.*

M. J. TOKAR, *Assistant Examiner.*